United States Patent Office 2,851,467
Patented Sept. 9, 1958

---

2,851,467

ALKYLTHIOUREA DERIVATIVES OF KOJIC ACID

Carl Peter Krimmel, Mundelein, Ill., assignor to G. D. Searle & Co., Chicago, Ill., a corporation of Illinois No Drawing. Application June 22, 1955
Serial No. 517,379

7 Claims. (Cl. 260—345.9)

The present invention relates to a new group of derivatives of 2-(5'-hydroxy-4'-oxo-2'-γ-pyranyl-methyl)-2-thiopseudoureas and particularly those substituted at the amino nitrogen atom by a lower alkyl or aryl group, and substituted at the imino nitrogen atom by a lower alkyl group. The basic compounds can be represented by the general structural formula

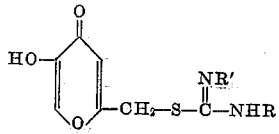

wherein R is a lower alkyl or aryl radical, and wherein R' is a hydrogen or lower alkyl radical.

In the foregoing structural formula the radical R can represent such lower alkyl radicals as methyl, ethyl, straight-chained and branched propyl, butyl, amyl, and hexyl radicals, cyclopentyl and cyclohexyl radicals. The radical R can also represent aryl radicals as phenyl and lower alkylated phenyl radicals, such as tolyl, xylyl, and the like. The radical R' can represent a hydrogen atom or a lower alkyl radical defined as hereinabove.

The thiopseudoureas of my invention are conveniently obtained as the hydrohalide salts by the condensation of a 5-hydroxy-2-halomethyl-4-pyrone with one equivalent of a thiourea derivative of the structural formula

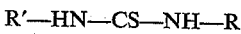

wherein R and R' are defined as hereinabove. The reaction is carried out conveniently in an organic solvent such as a lower aliphatic alcohol. The free bases are liberated from the hydrohalides by treatment with alkaline reagents.

The compounds of this invention possess valuable medicinal activity. Specifically, they are cardiovascular agents which produce a strong positive inotropic effect on the heart muscle. Further, they are potent anti-bacterial agents against gram-positive organisms. In addition, the 3-aryl derivatives are also active against gram-negative organisms.

It has been found that the compounds of this invention are active botanical mitotic agents which selectively attack the cells which undergo the most rapid division. The compounds are therefore useful in the production of new varieties of plants. In addition, they are also useful on topical administration as a substitute for podophyllin in the treatment of skin diseases such as warts. It is to be noted that the unsubstituted 2-(5'-hydroxy-4'-oxo-2'-γ-pyranylmethyl)-2-thiopseudourea does not share this mitotic activity and that its 3-alkenyl derivatives described and claimed in my copending application, Serial No. 411,011, filed February 17, 1954 (U. S. Patent 2,715,130, issued August 9, 1955), likewise lack this mitotic activity.

The following examples illustrate in further detail the compounds which constitute this invention and their synthesis, but are in no way to be construed as limiting the invention in spirit or in scope. Quantities of materials are indicated in parts by weight.

EXAMPLE 1

*2-(5'-hydroxy-4'-oxo-2'-γ-pyranylmethyl)-2-thio-3-methylpseudourea*

To 270 parts of N-methylthiourea in 720 parts of hot absolute ethanol are added 120 parts of 2-chloromethyl-5-hydroxy-4-pyrone. The reaction mixture is stirred and refluxed on the steam bath for 15 minutes. Crystallization of the clear amber reaction mixture is induced by cooling, scratching, and working drops of the reaction mixture with anhydrous ether. The resultant precipitate is filtered and washed with 180 parts of absolute ethanol. The product is recrystallized from absolute ethanol with charcoal decolorization to give a pale, tan-colored, water-soluble, crystalline powder melting at about 156–158° C. with decomposition to a frothy orange-brown liquid. The hydrochloride of 2-(5'-hydroxy-4'-oxo-2'-γ-pyranyl-methyl)-2-thio-3-methylpseudourea thus obtained has structural formula

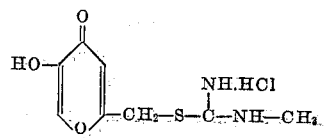

EXAMPLE 2

*2-(5'-hydroxy-4'-oxo-2'-γ-pyranylmethyl)-2-thio-3-ethylpseudourea*

To 26 parts of N-ethylthiourea in 180 parts of hot absolute ethanol are added 40 parts of 2-chloromethyl-5-hydroxy-4-pyrone. The reaction mixture is stirred and refluxed on the steam bath for 10 minutes. Crystallization of the clear greenish-brown reaction mixture is induced by working several drops of the reaction mixture with anhydrous ether and then scratching the cooled reaction mixture with the seed crystals. The resultant product is filtered, washed with 180 parts of absolute ethanol and recrystallized using decolorizing carbon and a minimum of hot absolute ethanol. After filtration, crystallization is induced by concentrating on the steam bath under vacuum, cooling and seeding. The product is a cream-colored, water-soluble, crystalline powder melting to a frothy-brown liquid at 152–154° C. The hydrochloride of 2-(5'-hydroxy-4'-oxo-2'-γ-pyranyl-methyl)-2-thio-3-ethylpseudourea thus obtained has the structural formula

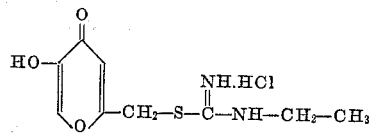

EXAMPLE 3

*2-(5'-hydroxy-4'-oxo-2'-γ-pyranylmethyl)-2-thio-3-phenyl-pseudourea*

A mixture of 76 parts of 1-phenyl-2-thiourea, 80 parts of 2-chloromethyl-5-hydroxy-4-pyrone, and 360 parts of absolute ethanol is stirred and refluxed on the steam bath for 15 minutes. Upon cooling, a crystalline deposit separates from the clear yellow-brown reaction mixture. This material is twice recrystallized by dissolving in hot methanol, treating with decolorizing carbon, filtering, concentrating the filtrate on the steam bath under vacuum, cooling, and seeding. The product is obtained as a white, crystalline powder melting at about 186–187° C. with decomposition to a dark brown, frothy liquid. The hydrochloride of 2-(5'-hydroxy-4'-oxo-2'-γ-pyranylmethyl)-

2-thio-3-phenylpseudourea thus obtained has the structural formula

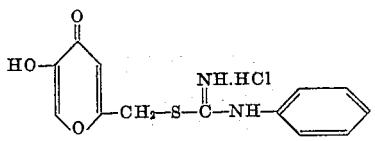

EXAMPLE 4

*2 - (5' - hydroxy - 4'-oxo-2'-γ-pyranylmethyl)-2-thio-3-(p-tolyl)pseudourea*

By substitution of 83 parts of 1-(p-tolyl)-2-thiourea for the 1-phenyl-2-thiourea in the preceding example there is obtained a white crystalline powder consisting of a solvate of the hydrochloride of 2-(5'-hydroxy-4'-oxo-2'-γ-pyranylmethyl)-2-thio-3-(p-tolyl)pseudourea of the structural formula

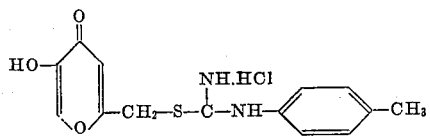

EXAMPLE 5

*2 - (5' - hydroxy-4'-oxo-2'-γ-pyranylmethyl)-2-thio-1,3-dimethylpseudourea*

To a solution of 32 parts of 1,3-dimethylthiourea in 240 parts of hot absolute ethanol are added 50 parts of 2-chloromethyl-5-hydroxy-4-pyrone. The reaction mixture is refluxed on the steam bath for 30 minutes. The clear yellow reaction mixture is cooled and anhydrous ether is added to precipitate the product as a white gum. The gum is crystallized by taking it up in hot isopropanol. The product is recrystallized from hot absolute ethanol to give pale pinkish-brown, water-soluble crystalline granules melting without gassing at 138–140° C. The hydrochloride of 2-(5'-hydroxy-4'-oxo-2'-γ-pyranylmethyl)-2-thio-1,3-dimethylpseudourea thus obtained has the structural formula

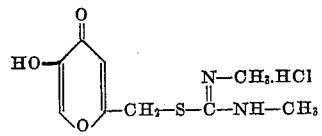

EXAMPLE 6

*2 - (5' - hydroxy-4'-oxo-2'-γ-pyranylmethyl)-2-thio-1,3-dipropylpseudourea*

A mixture of 92 parts of 1,3-dipropylthiourea, 100 parts of 2-chloromethyl-5-hydroxy-4-pyrone and 600 parts of hot absolute ethanol is refluxed on a steam bath for 30 minutes and then cooled and triturated with anhydrous ether. The resulting precipitate is taken up in hot isopropanol and on cooling the crystalline hydrochloride of 2-(5'-hydroxy-4'-oxo-2'-γ-pyranylmethyl)-2-thio-1,3-dipropylpseudourea is obtained which has the structural formula

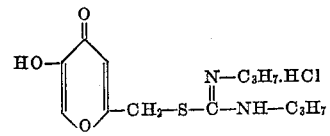

What is claimed is:

1. A compound of the structural formula

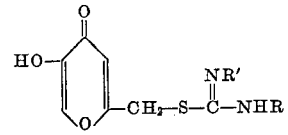

wherein R is a member of the class consisting of lower alkyl radicals, phenyl and (lower alkyl)-phenyl radicals and wherein R' is a member of the class consisting of hydrogen and lower alkyl radicals.

2. A compound of the structural formula

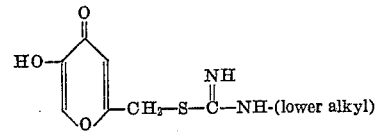

3. 2-(5'-hydroxy-4'-oxo-2'-γ-pyranylmethyl) - 2 - thio-3-methylpseudourea.

4. 2-(5'-hydroxy-4'-oxo-2' - γ - pyranylmethyl)-2-thio-3-ethylpseudourea.

5. 2-(5'-hydroxy-4'-oxo-2'-γ-pyranylmethyl) - 2 - thio-3-phenylpseudourea.

6. A compound of the structural formula

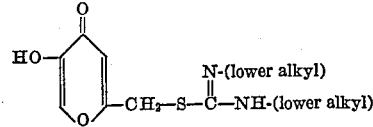

7. 2-(5'-hydroxy-4'-oxo-2'-γ-pyranylmethyl) - 2 - thio-1,3-dimethylpseudourea.

References Cited in the file of this patent

UNITED STATES PATENTS

| | | |
|---|---|---|
| 2,422,740 | Morey | June 24, 1947 |
| 2,700,045 | Krimmel | Jan. 28, 1955 |
| 2,715,130 | Krimmel | Aug. 9, 1955 |

OTHER REFERENCES

Kipnis et al.: JACS, vol. 70, pages 4264–5 (1948).